(12) United States Patent
Milliren

(10) Patent No.: US 7,078,443 B2
(45) Date of Patent: Jul. 18, 2006

(54) VISCOELASTIC FOAM LAYER AND COMPOSITION

(75) Inventor: Charles M. Milliren, Chesterland, OH (US)

(73) Assignee: Intellectual Property Holdings, LLC, Cleveland, OH (US)

( * ) Notice: Subject to any disclaimer, the term of this patent is extended or adjusted under 35 U.S.C. 154(b) by 0 days.

(21) Appl. No.: 10/691,052

(22) Filed: Oct. 22, 2003

(65) Prior Publication Data

US 2005/0090573 A1 Apr. 28, 2005

(51) Int. Cl.
*C08G 18/28* (2006.01)
(52) U.S. Cl. ............... 521/167; 521/125; 521/126; 521/127; 521/128; 521/129; 521/130; 521/159; 521/163; 521/164; 521/170; 521/174; 521/131
(58) Field of Classification Search ............... 521/159, 521/128, 125, 126, 127, 129, 130, 131, 170, 521/174, 163, 164, 167
See application file for complete search history.

(56) References Cited

U.S. PATENT DOCUMENTS

| | | | |
|---|---|---|---|
| 3,811,437 A | 5/1974 | Gardner, Jr. |
| 4,029,534 A | 6/1977 | Bocks et al. |
| 4,116,893 A | 9/1978 | Flanagan |
| 4,158,087 A | 6/1979 | Wood |
| 4,190,712 A | 2/1980 | Flanagan |
| 4,209,593 A | 6/1980 | Khanna |
| 4,212,954 A | 7/1980 | Nomura et al. |
| 4,282,330 A | 8/1981 | Austin |
| 4,346,205 A | 8/1982 | Hiles |
| 4,722,946 A | 2/1988 | Hostettler |
| 4,808,469 A | 2/1989 | Hiles |
| 4,866,102 A | 9/1989 | Pray et al. |
| 4,876,292 A | 10/1989 | Milliren |
| 4,980,386 A | 12/1990 | Tiao et al. |
| 4,987,156 A | 1/1991 | Tozune et al. |
| 5,028,637 A | 7/1991 | Milliren |
| 5,063,253 A | 11/1991 | Gansen et al. |
| 5,094,318 A | 3/1992 | Maeda et al. |
| 5,143,941 A | 9/1992 | Rossio et al. |
| 5,167,884 A | 12/1992 | Rossio et al. |
| 5,203,352 A | 4/1993 | Gardner, Jr. |
| 5,216,041 A | 6/1993 | Rossio et al. |
| 5,248,703 A | 9/1993 | Krueger et al. |
| 5,248,704 A | 9/1993 | Rossio et al. |
| 5,252,624 A | 10/1993 | Milliren et al. |
| 5,258,416 A | 11/1993 | Krueger et al. |
| 5,284,882 A | 2/1994 | Rossio et al. |
| 5,389,316 A | 2/1995 | Kerman |
| 5,405,886 A | 4/1995 | Milliren et al. |
| 5,415,802 A | 5/1995 | Milliren et al. |
| 5,417,880 A | 5/1995 | Milliren et al. |
| 5,420,170 A | 5/1995 | Lutter et al. |
| 5,449,700 A | 9/1995 | Milliren et al. |
| 5,453,455 A | 9/1995 | Krueger et al. |
| 5,457,137 A | 10/1995 | Milliren et al. |
| 5,476,969 A | 12/1995 | Hinz et al. |
| 5,527,833 A | 6/1996 | Kuczynski et al. |
| 5,580,651 A | 12/1996 | Kerman |
| 5,594,097 A * | 1/1997 | Chaffanjon et al. ......... 528/419 |
| 5,669,094 A | 9/1997 | Swanson |
| 5,672,636 A | 9/1997 | Horn et al. |
| 5,698,609 A | 12/1997 | Lockwood et al. |
| 5,847,014 A | 12/1998 | Nodelman et al. |
| 5,874,485 A | 2/1999 | Milliren et al. |
| 5,919,935 A | 7/1999 | Platz et al. |
| 6,028,122 A | 2/2000 | Everitt et al. |
| 6,034,148 A | 3/2000 | Kelly et al. |
| 6,051,624 A | 4/2000 | Bastin et al. |
| 6,100,363 A | 8/2000 | Sampara et al. |
| 6,108,825 A | 8/2000 | Bell et al. |
| 6,127,443 A | 10/2000 | Perry et al. |
| 6,136,879 A | 10/2000 | Nishida et al. |
| 6,235,138 B1 | 5/2001 | Parks et al. |
| 6,258,867 B1 | 7/2001 | Nodelman et al. |
| 6,316,514 B1 | 11/2001 | Falke et al. |
| 6,326,077 B1 | 12/2001 | Monaci |
| 6,337,356 B1 | 1/2002 | Zaschke et al. |
| 6,346,204 B1 | 2/2002 | Eling |
| 6,379,595 B1 | 4/2002 | Byma et al. |
| 6,391,933 B1 | 5/2002 | Mattesky |
| 6,391,935 B1 | 5/2002 | Hager et al. |
| 6,420,447 B1 | 7/2002 | Kittel et al. |
| 6,420,448 B1 | 7/2002 | Hnatow et al. |
| 6,425,141 B1 | 7/2002 | Ewing et al. |
| 6,451,233 B1 | 9/2002 | Byma et al. |
| 6,451,430 B1 | 9/2002 | Smith |
| 6,472,473 B1 | 10/2002 | Ansems et al. |
| 6,491,846 B1 | 12/2002 | Reese, II et al. |
| 6,506,813 B1 | 1/2003 | Parfondry et al. |
| 6,521,674 B1 | 2/2003 | Haley et al. |
| 6,586,485 B1 | 7/2003 | Bruchmann et al. |
| 6,586,486 B1 | 7/2003 | Falke et al. |

(Continued)

*Primary Examiner*—John M. Cooney, Jr.
(74) *Attorney, Agent, or Firm*—Pearne & Gordon LLP

(57) ABSTRACT

A viscoelastic foam is provided having an amine-based polyol system to impart strength, recoverability and endurance to the foam, and an appropriately selected trifunctional non-amine-based polyol system to provide flexibility to the foam. The combination of amine-based and non amine-based polyols provides a viscoelastic semi-rigid foam with excellent impact and recovery properties, recovering to substantially 100% of its initial volume and shape following an impact, yet with high rigidity and stiffness so that it is effective at absorbing high as well as low-energy impacts. A method of making the above viscoelastic foam is also provided. In a preferred embodiment, the foam is made using an allophanate-modified MDI prepolymer in order to provide the isocyanate in liquid form at standard temperature and pressure in order to simplify the production of the invented viscoelastic foams.

38 Claims, 16 Drawing Sheets

U.S. PATENT DOCUMENTS

| | | |
|---|---|---|
| 6,586,487 B1 | 7/2003 | Nodelman et al. |
| 6,610,618 B1 | 8/2003 | Bottger et al. |
| 6,612,217 B1 | 9/2003 | Shockey et al. |
| 6,617,369 B1 | 9/2003 | Parfondry et al. |
| 6,635,203 B1 | 10/2003 | Monaci |
| 6,653,363 B1 | 11/2003 | Tursi, Jr. et al. |
| 6,762,274 B1 | 7/2004 | Waddington et al. |
| 2004/0097608 A1 | 5/2004 | Re'em |
| 2004/0127590 A1 | 7/2004 | Whinnery et al. |
| 2004/0242718 A1 | 12/2004 | Tu et al. |
| 2004/0254256 A1 | 12/2004 | Lockwood et al. |
| 2004/0266897 A1 | 12/2004 | Apichatachutapan et al. |
| 2004/0266900 A1 | 12/2004 | Neff et al. |
| 2005/0038133 A1 | 2/2005 | Neff et al. |

\* cited by examiner

VISCOELASTIC FOAM LAYER AND COMPOSITION

BACKGROUND OF THE INVENTION

Polymeric protective foams (e.g. protective foam layers) are widely used for impact force attenuation in a variety of safety-related applications. These include but are not limited to automotive applications, sport applications, bedding applications, footwear applications, and etc. In general, a protective foam layer is placed adjacent or against a part of a person's body in order to protect that body part (e.g. a head) during an impact with, for example, the ground or even another person's head.

Protective foams function by absorbing and/or dissipating the impact energy from the force of an impact. An energy absorbing foam deforms or crushes upon impact thereby consuming a portion of the impact energy so that portion does not reach the underlying body part. An energy dissipating foam also spreads the impact force over a larger surface area than the actual area of impact so that the force per unit area is decreased for the underlying body part compared to that for the initial impact surface (e.g. the outer surface of the protective layer or a hard outer shell over the protective layer).

All rigid or semi-rigid protective foams are energy dissipating foams to some extent because, due to their rigidity, they do not instantaneously yield upon impact. Instantaneous yielding would result in the transmission of the entire impact force to the localized region of the underlying body part immediately beneath the protective layer at the point of impact. Instead, rigid and semi-rigid foam layers typically have sufficient rigidity to transmit at least a portion of the impact energy from the point source (impact site) to lateral or adjacent regions of the foam layer before the energy is transmitted to the underlying body part. The result is to spread the impact force over a larger area and thereby reduce the force per unit area experienced by the underlying body part as described above.

However, traditional rigid and semi-rigid foams exhibit satisfactory energy absorption only above certain impact speeds, e.g. above about 4–7 meters/second (m/s) for expanded polystyrene (EPS) which is the most common rigid foam found in bicycle and motorcycle helmets. This is because the foam is so stiff that it must experience a minimum threshold impact velocity in order for there to be sufficient energy to crush the foam Practically, this means that up to this threshold velocity, virtually all impact energy will be transmitted to the underlying body part and not absorbed by a rigid foam like EPS. An additional problem with EPS foams is that they are non-recovering; i.e. they do not recover or rebound to any significant degree once they have been crushed from an impact. They are effective for only single-impact use and then must be discarded.

Existing semi-rigid polyurethane foams address these shortcomings to some extent as a result of their limited viscoelastic properties. Though existing semi-rigid foams can be compressed or deflected at lower impact velocities to absorb some degree of the impact energy, they cannot effectively absorb the energy from higher velocity impacts compared to rigid foams like EPS. Some designers have attempted to formulate urethane foams that are more rigid and can provide protection similar to EPS. However, these more rigid urethane foams also correspondingly begin to suffer from the same drawbacks, which initially led the designers away from rigid foams like EPS. The more rigid the foam, the less it will recover after being crushed, and the poorer low to moderate impact energy absorption it will provide.

Consequently, there is a need in the art for a semi-rigid viscoelastic polymeric foam that is rigid enough to provide adequate impact energy absorption at high impact speeds, e.g. 4–7 m/s or greater, and yet recovers substantially 100% after impact. Most preferably, such an improved foam will also provide adequate low to moderate speed impact protection to the underlying body part of a user of the foam.

SUMMARY OF THE INVENTION

A viscoelastic foam made from a Part A composition and a Part B composition is provided. The Part A composition has 20–50 weight percent isocyanate (NCO), and the Part B composition has at least 20 parts by weight of a first, amine-based polyether polyol, at least 10 parts by weight of a second polyol selected from the group consisting of filled polyether polyols and unfilled polyether polyols, and 0.4–4 parts by weight catalyst. The Part A and Part B compositions are combined to provide the viscoelastic foam. The foam has an index of 70–130.

A further viscoelastic foam made from a Part A composition and a Part B composition is provided The Part A composition has 20–50 weight percent isocyanate (NCO), and the Part B composition has at least 20 parts by weight of a first, amine-based polyether polyol, at least 10 parts by weight of a second, tri-functional polyether polyol, and 0.4–4 parts by weight catalyst. The Part A and Part B compositions are combined to provide the viscoelastic foam. The foam has an index of 70–130.

A method of making a viscoelastic foam is also provided including the following steps: a) providing a Part A composition having 20–50 weight percent isocyanate; b) providing a Part B composition having at least 20 parts by weight amine-based polyether polyol, at least 10 parts by weight of a polyol selected from the group consisting of filled polyether polyols and unfilled polyether polyols, and 0.4–4 parts by weight catalyst; and c) combining the Part A and Part B compositions to provide the viscoelastic foam. The resulting foam has an index of 70–130.

A further method of making a viscoelastic foam is provided including the following steps of a) providing a Part A composition having 20–50 weight percent isocyanate; b) providing a Part B composition having at least 20 parts by weight amine-based polyether polyol, at least 10 parts by weight of a tri-functional polyether polyol, and 0.4–4 parts by weight catalyst; and c) combining the Part A and Part B compositions to provide the viscoelastic foam. The resulting foam has an index of 70–130.

DETAILED DESCRIPTION OF THE PREFERRED EMBODIMENTS OF THE INVENTION

Figure 1:
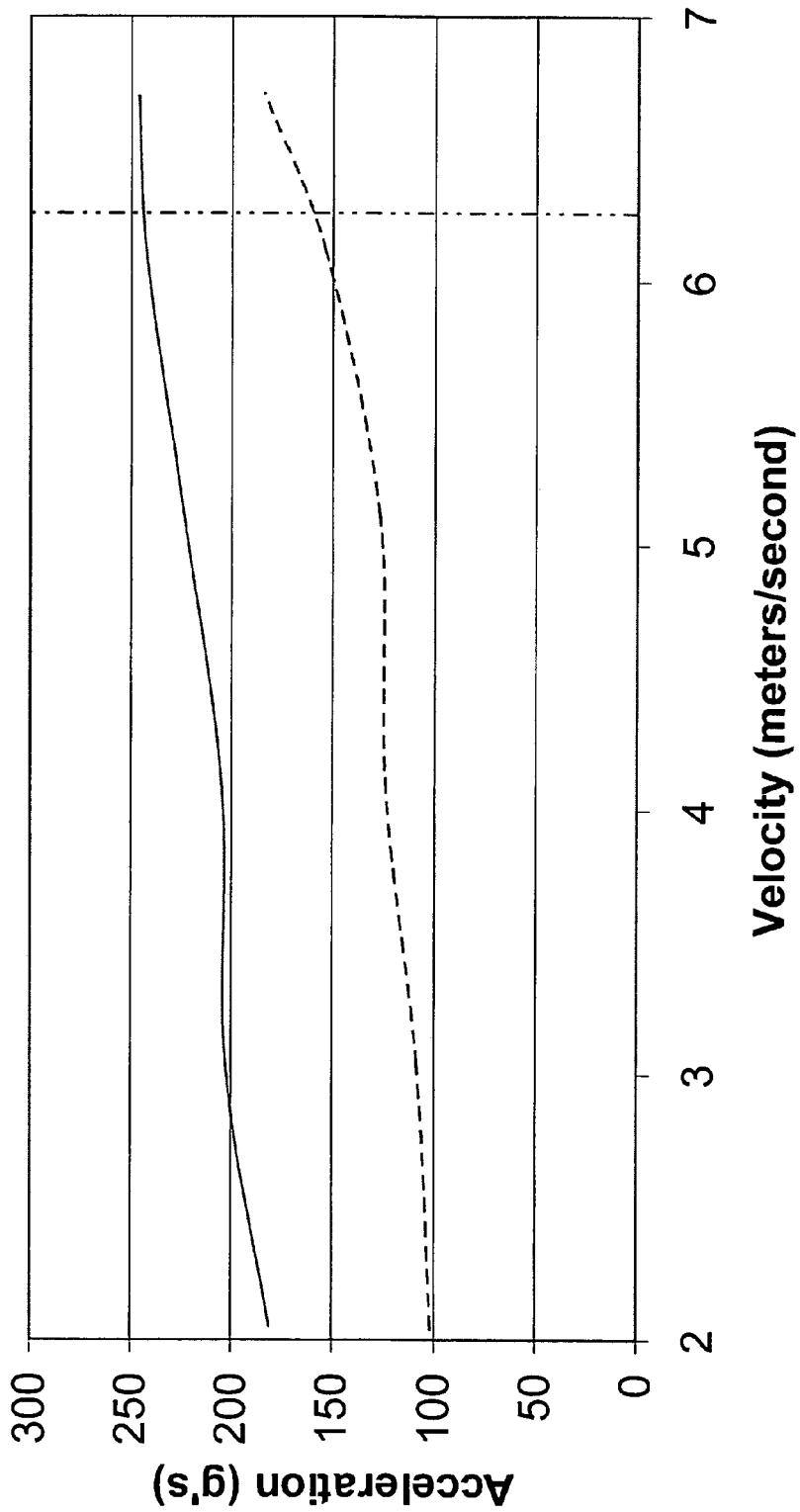
FIG. 1 is a graph of acceleration versus velocity comparing the performance of the invented viscoelastic foam of Example 1 with expanded polystyrene using a flat impactor.

A technology based upon a novel polyol mixture has now been developed which allows for the production of molded energy absorbing foams that possess the desired characteristics of absorbing both high (above 4–7 m/s) and low speed dynamic impacts without permanent deformation. As used herein, when a range such as 5–25 (or 5 to 25) is given, this means preferably at least 5 and, separately and independently, preferably not more than 25. Unless otherwise explicitly indicated, all parts herein are parts by weight.

A composition and method of making the invented viscoelastic polymeric foam is provided. The invented foam is preferably prepared by blending a Part B composition with a Part A composition. The Part A and B compositions are preferably prepared separately. Table 1 below discloses the compositions of Parts A and B that are subsequently blended to provide examples of the invented viscoelastic polymeric foam. In Table 1, for Part A all values are weight percents with respect to the total composition of Part A. For Part B, all values are parts by weight with respect to the total composition of Part B. For each of Parts A and B, any less preferred or more preferred concentration or range for any one component can be combined with any less preferred or more preferred concentration or range for any of the other components; it is not necessary or required that all of the concentrations or ranges for all of the components for either Part A or Part B come from the same column.

TABLE 1

Part A and B Compositions for Invented Viscoelastic Foam

| Component | Preferred | Less Preferred | Less Preferred |
|---|---|---|---|
| Part A | | Weight Percent | |
| Isocyanate (% NCO) | about 23 | 22–26<br>18–29<br>18–40 | 16–45<br>14 to about 50 |
| Part B | | Parts By Weight | |
| Amine-based polyether polyol | 49–51<br>45–55 | 40–60<br>35–65 | 30–70<br>25–75<br>20–80 |
| Filled polyether polyol | 24–25<br>22–28 | 20–30<br>18–32<br>15–35 | 12–36<br>10–40<br>0–50 |
| Unfilled polyether polyol | 24.5–25.5<br>22–28 | 20–30<br>18–32<br>15–35 | 12–36<br>10–40<br>0–50 |
| Catalyst | 0.4–2.5<br>0.5–2.05 | 1.7–2.1<br>1.6–2.2<br>1.5–2.3 | 1.4–2.4<br>1.3–2.5<br>1–3<br>0.5–4 |
| Blowing agent | 3 | 2.8–3.2<br>2.5–4 | 2.2–4.2<br>2–4.5<br>0.5–5 |

TABLE 1-continued

Part A and B Compositions for Invented Viscoelastic Foam

| Component | Preferred | Less Preferred | Less Preferred |
|---|---|---|---|
| Black paste | 6 | 5.8–6.2<br>5.5–6.5 | 5–7<br>4–8<br>2–10<br>0–15 |

Each of the components from Table 1 above will now be discussed. The Part B components are discussed first.

The amine-based polyether polyol component is provided to impart strength and durability to the finished viscoelastic foam. Amine-based polyols are more reactive than non-amine-based polyols that are typically used in viscoelastic foams. A wide variety of amine-based polyols are known in the art, such as monoethanolamine-based polyether polyols, diethanolamine-based polyether polyols, ethylenediamine-based polyether polyols and triethanolamine-based polyether polyols. Preferably, the amine-based polyether polyol has a propylene oxide (less preferably ethylene oxide) extended tip, and is at least 2, preferably at least 3 or 4, functional; i.e. the amine-based polyether polyol preferably has at least 2, preferably at least 3 or 4, functional reactive sites per molecule.

In one embodiment, the invented viscoelastic foam could comprise only a single amine-based polyether polyol that is at least 3-functional and has an OH number less than 150. In this embodiment, the amine-based polyol is preferably a diamine-based polyol, preferably ethylene diamine, which is 4 functional.

Most preferably, the amine-based polyether polyol component is a mixture of amine-based polyether polyols where the sum of the weights of all such polyols corresponds to the parts by weight listed in Table 1 for the amine-based polyol component. In a preferred embodiment, the amine-based polyol component is comprised of the following three polyols in the following preferred parts by weight:

1. Monoethanolamine-based polyol: 1–15, preferably 2–14.5, preferably 3–14, preferably 4–13.5, preferably 5–12, preferably 7–11.5, preferably 8–11, preferably 9–10, preferably about 9.5;

2. Triethanol amine-based polyol: 5–30, preferably 6–25, preferably 7–20, preferably 8–15, preferably 9–12, preferably 10–11, preferably about 10.5; and 3. Ethylenediamine-based polyol: 16–50, preferably 18–48, preferably 20–46, preferably 22–40, preferably 24–38, preferably 26–36, preferably 28–34, preferably about 31.

Most preferably, each of the above amine-based polyol(s) is propylene oxide tipped in order to slow the foam reaction rate, and at least 3-functional; a diamine-based polyol preferably is 4-functional.

The above combination of amine-based polyols, when combined with the other components listed in Table 1 and reacted as described below, has been found to produce excellent viscoelastic foams that mold well, have good mold release characteristics and are very strong (comparable to EPS for high energy impacts) foams that recover substantially 100% after impact.

The filled polyether polyol component preferably is at least tri-functional and preferably is glycerin based Less preferably, filled polyether polyols of higher or lower functionality could be used. The filled polyol functions as a cell-opener during the foaming reaction. Secondarily, the filled polyol also provides some measure of stiffness to the foam as a result of the filler material. Preferably, the filler is styrene-acrylonitrile (SAN), and is present in the polyol in a concentration of 20–60, preferably 35–50 percent by weight. Alternatively, other suitable filled polyether polyols known or conventional in the art can be used. Selection of a polyol having comparable properties to an SAN filled polyether polyol is within the ability of a person of ordinary skill in the art.

The unfilled polyether polyol component preferably is also at least tri-functional and preferably also is glycerin based. Less preferably, other unfilled polyether polyols could be used; e.g. 2 to 6 functional unfilled polyether polyols. The unfilled polyol component provides flexibility and recoverability to the foam, to complement the strength, endurance and rigidity imparted by the amine-based polyol component. Alternatively, other suitable unfilled polyether polyols known or conventional in the art can be used. Selection of an unfilled polyol having comparable properties to those of the polyol used in the invention is within the ability of a person of ordinary skill in the art.

From the above two paragraphs, one can see that both the filled and unfilled polyether polyol components are preferably tri-functional. It is important to note that, while Table 1 indicates in the right-most column that the concentration of each of these components in the Part B composition can be zero, they cannot both be zero; there must be at least one of either the unfilled polyol or the filled polyol components in the Part B composition. In the event that only a single filled or unfilled polyether polyol is used, it is preferably a filled polyol, and preferably has a high molecular weight, e.g. at least 3000–6000 for di-functional polyols, and at least 5000–10000 for tri-functional polyols. If only a single filled or unfilled polyol is to be used, preferably it is provided in the Part B composition in an amount of 10–75, preferably 15–70, preferably 20–65, preferably 30–60 parts by weight.

The catalyst component is preferably a mixture of catalysts, which have been found to promote a good foaming reaction and the successful production of the preferred foam product from the components listed in Table 1. The catalyst component may include any of the following three types of catalysts where the sum of the weights of each catalyst corresponds to the parts by weight listed in Table 1 for the catalyst component:

1. Amine catalyst: Preferably one or more tertiary amine catalysts in an amount of 0.4–2.5 parts by weight.
2. Delayed action catalyst: 0–1 parts by weight (preferably 0.001–1) parts by weight.
3. Trimer catalyst: Preferably a quaternary ammonium salt trimer catalyst in an amount of 0–1 (preferably 0.05–1) parts by weight.

Alternatively, the catalyst component can be any other suitable catalyst or catalysts selected by a person of ordinary skill in the art to provide suitable foaming to provide the invented viscoelastic foam having the physical properties and other characteristics herein described. The above stated catalysts have been found to provide a highly desirable foam according to the invention where it is believed that the amine catalyst affords good foam processing and moldability. Where used, the delayed action catalyst simultaneously promotes good curing of the foam and good skin cure and, where used, the trimer catalyst acts as a blowing catalyst to expand the foam during the foaming reaction as well as functioning as a high index gel catalyst. The preferred catalyst system results in very easily processable foams. The preferred catalyst systems are stable, in that each of the listed catalysts is stable with respect to one another.

The blowing agent component is preferably water, preferably distilled, deionized water to prevent unwanted impurities from entering the foaming composition and/or interfering with the foam reaction. The water reacts with the isocyanate component from the Part A composition to produce $CO_2$ (via a catalyzed mechanism using the catalysts described above). The production and expansion of $CO_2$ is responsible for foaming and expansion as is generally understood by persons of ordinary skill in the art. Less preferably, other suitable blowing agents could be used.

The black paste component is a conventional carbon-based pigment in a polyether carrier known in the art. Preferably the black paste has an OH number of about 20–150. The black paste provides pigmentation to the finished foam product.

By convention, the amounts of all the polyether polyol components from Table 1 sum to 100 parts by weight in the part B composition. In other words, the total parts by weight of the amine-based polyol and the filled and unfilled polyols equals 100 parts by weight in Part B, with the remaining components (catalyst, blowing agent, etc.) being present in the preferred parts by weight listed in Table 1.

In the Part A composition, the isocyanate is provided. The isocyanate can be provided in any suitable functional form, though the most typical is in the form of pure or modified 4,4'-bisphenylmethane diisocyanate or methylene bisphenyl diisocyanate (MDI). MDI is a commercially available source of isocyanate and is a solid crystalline substance provided as a white to yellowish powder or flakes. Pure MDI contains about 33.6% isocyanate (NCO) by weight. So if Part A is comprised exclusively of MDI powder or flakes, then the Part A composition has ~33.6% NCO. MDI is preferred because it is di-functional; i.e. each MDI molecule contains two reactive NCO sites. However, being a solid, MDI can result in some processing difficulties.

Modified MDI products that are liquids are preferred sources of isocyanate. Most preferably, the isocyanate is provided in the Part A composition as an allophanate-modified MDI prepolymer. MDI can be reacted with alcohols via a known reaction mechanism to provide the allophanate-modified MDI prepolymers. Like MDI, the allophanate-modified MDI molecule is also di-functional, having two reactive NCO sites. However, unlike MDI, the allophanate-modified MDI prepolymer can be a liquid at standard temperature and pressure (298K and 1 atm). This greatly simplifies foam processing. The allophanate-modified MDI molecule has a higher molecular weight than MDI. Hence it has a lower effectively concentration of NCO, typically about 20–30%. So, to achieve an equivalent amount of NCO, a larger mass of the allophanate-modified MDI must be provided compared to unmodified MDI. Less preferably, other NCO-containing prepolymers known in the art, e.g. other MDI prepolymers, TDI (toluene diisocyanate) prepolymers and the like can be used Less preferably, mixtures of different types of prepolymers may also be used.

It will be understood that in Table 1 the weight percent concentrations listed for isocyanate (% NCO) in the Part A composition are for the isocyanate (NCO) functional groups alone, excluding the weight of the molecule(s) to which the NCO groups are attached. So, for example, if the Part A composition consists of 100 weight percent allophanate-modified MDI prepolymer, (the most preferred embodiment), then NCO is present in the Part A composition in a concentration of typically 20–30% weight percent (see above paragraph).

Once the Part A and B compositions are prepared as described above, they are combined and poured or injected into a molding cavity and allowed to react. A typical reaction time is 3–15, preferably about 5–7 minutes, after which the finished foam part can be de-molded. The Part A and Part B compositions are combined in the mold in a particular ratio to achieve the desired index for the foaming reaction. Index is defined as the following stoichiometric ratio:

$$\text{Index} = 100 \times \frac{\text{Number of equivalents of isocyanate in Part } A}{\text{Number of equivalents of isocyanate reactive materials in Part } B}$$

Preferably, the Part A and Part B compositions are combined to provide an index of 70–130, preferably 75–120, preferably 80–115, preferably 90–100. The resulting viscoelastic foam is very stiff, largely due to the structure of the isocyanate in the finished foam product, but is still a semi-rigid viscoelastic foam that recovers substantially 100% even after a high-energy impact; e.g. 4–7 m/s or greater.

It is important for a viscoelastic foam according to the invention to have an amine-based polyol or polyol system to impart strength, recoverability, endurance and rigidity to the foam, and to have appropriately selected high molecular weight filled and/or unfilled polyol or polyols in combination with the amine-based polyol to provide the desired flexibility to the foam. The combination of amine-based and filled and/or unfilled polyols described above has been found to provide a semi-rigid viscoelastic foam with excellent impact and recovery properties. The invented foams recover to substantially 100% of their initial volume and shape following an impact, yet display high stiffness and flexibility so that they are effective at absorbing high as well as low-energy impacts. If the amine-based polyols are to be eliminated in favor of non-amine polyols of similar molecular weight, then the composition will usually include a suitable surfactant to function as a foam stabilizer or alternatively as a cell-opening agent during foaming. Silicones are typical surfactants used for this purpose. These types of surfactants are not recommended in the present invention as they can result in post-demold expansion of the finished foam product. This is highly undesirable.

It will be understood that additional components that are known or conventional in the art can be added in conventional amounts to either the Part A or Part B compositions described Such additional components may be selected by a person having ordinary skill in the art to impart additional desired properties to the invented foam without substantially detracting from its improved and novel characteristics. Some such additional components may include reactive and non-reactive fillers, silicones, cross-inking agents, amine terminated polyethers, anti-microbial agents, fire retardants, plasticizers, colorants and pigments, chain extenders, etc.

EXAMPLES

Example 1

Eight foams were prepared from compositions according to the invention. Each of the eight foams was prepared by combining Part A and Part B compositions having the components in the amounts listed in Table 2 below for the respective foam.

TABLE 2

Part A and B compositions for eight foams prepared according to the invention

| Element | Foam | | | | | | | |
|---|---|---|---|---|---|---|---|---|
| | 1 | 2 | 3 | 4 | 5 | 6 | 7 | 8 |
| Part B [components listed in part by weight (pbw)] | | | | | | | | |
| Monoethanolamine-based polyol | / | 4 | 9.5 | 9.5 | 11 | 15 | 14 | 9.5 |
| Triethanolamine-based polyol | 25 | 21 | 10.5 | 10.5 | / | / | 11 | 10.5 |
| Ethylenediamine-Based polyol | 26 | 26 | 31 | 31 | 40 | 36 | 26 | / |
| Filled polyol | 24 | 24 | 24 | 49 | 24 | 24 | 24 | 16 |
| Unfilled polyol | 25 | 25 | 25 | / | 25 | 25 | 25 | 64 |
| Black Paste | 6 | 6 | 6 | 6 | 6 | 6 | 6 | 6 |
| Water | 3 | 3 | 3 | 3 | 3 | 3 | 2.5 | 4 |
| Catalyst 1 | 1 | 1.25 | 1.5 | 1.5 | 1.15 | 0.85 | 0.9 | 0.35 |
| Catalyst 2 | / | / | 0.05 | / | 0.1 | 0.175 | 0.15 | 0.25 |
| Catalyst 3 | 1 | 0.25 | / | / | / | / | / | / |
| Catalyst 4 | 0.5 | 0.5 | / | / | / | / | / | / |
| Part A | | | | | | | | |
| Isocyanate (wt. %) | 23 | 23 | 23 | 23 | 23 | 23 | 23 | 23 |
| Foam Index | 115 | 107 | 99 | 100 | 99 | 96 | 100 | 95 |

In Table 2, the following listed elements represent the following components:

The monoethanolamine-based polyol is a polyether polyol having an OH No. of about 700;

The triethanolamine-based polyol is a polyether polyol having an OH No. of about 150;

The ethylenediamine-based polyol is a polyether polyol having an OH No. of about 60;

The filled polyol is an SAN-filled polyether polyol having an OH No. of about 20;

The unfilled polyol is also a polyether polyol having an OH No. of about 35;

The Black Paste is a carbon black pigment dispersion, OH No. 105, available from Ferro Corporation as Blue Shade LV Super Black;

Catalyst 1 is an amine catalyst, OH No. 560, available from Air Products and Chemicals, Inc. as DABCO 33-LV;

Catalyst 2 is an amine catalyst, OH No. 251, available from Air Products and Chemicals, Inc. as DABCO BL-11;

Catalyst 3 is an delayed action catalyst, OH No. 689, available from Air Products and Chemicals, Inc. as DABCO DC-1;

Catalyst 4 is an trimerization catalyst, OH No. 687, available from Air Products and Chemicals, Inc. as DABCO TMR-4;

Isocyanate is an allophanate modified MDI, 23 wt. % NCO, available from Bayer Corporation as Mondur MA-2300.

As explained above, 23% NCO in the Part A composition of Table 2 means that Part A consists essentially of 100 wt. % allophanate modified MDI, about 23 wt. % of which consists in the NCO functional groups.

Figure 2:
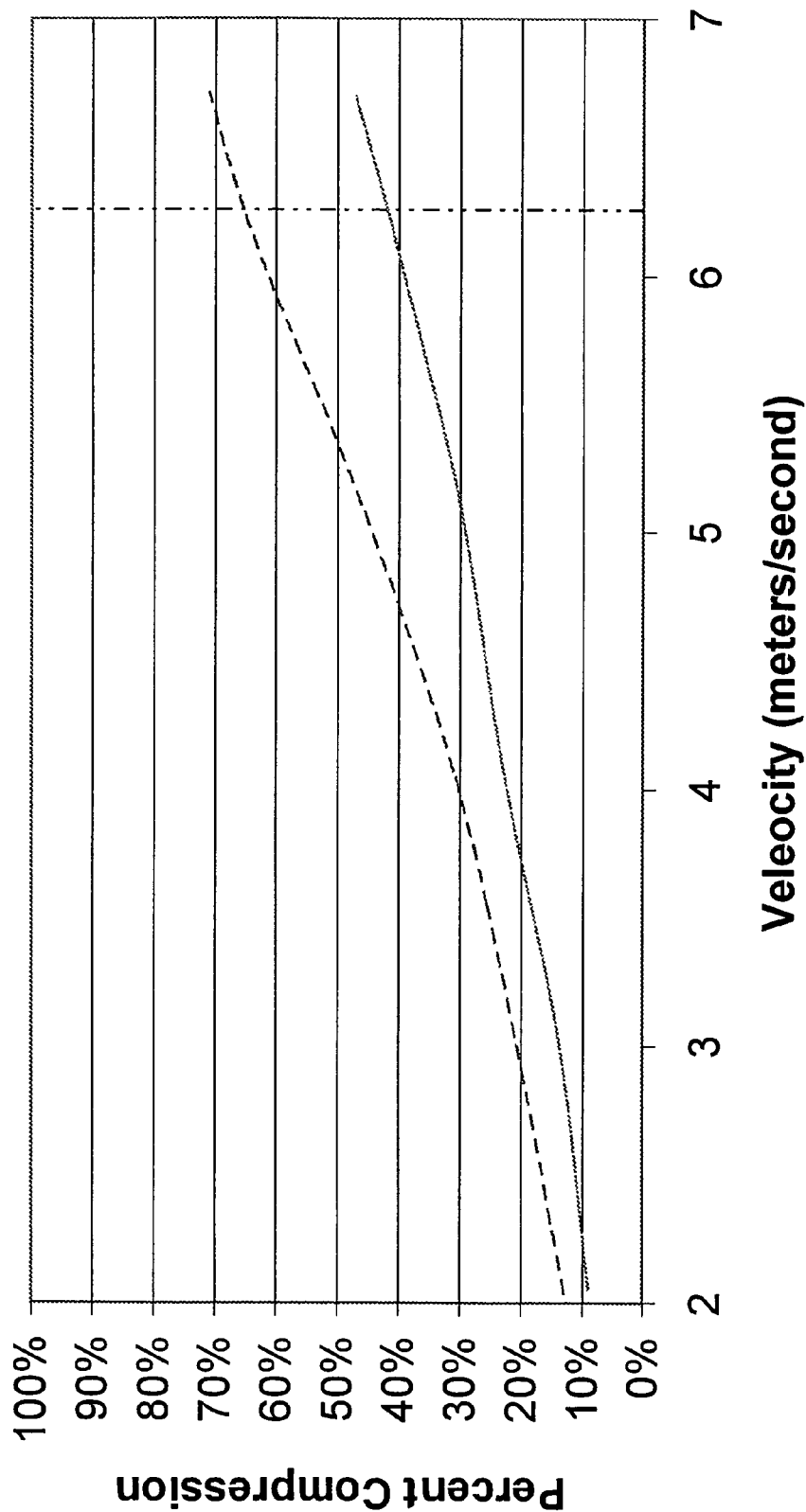
FIG. 2 is a graph of percent compression versus velocity comparing the performance of the invented viscoelastic foam of Example 1 with expanded polystyrene using a flat impactor.

Each of the eight foams whose composition is listed in Table 2 was prepared according to the following method. The Part B components for each foam were preblended and then mixed for 10 seconds with the Part A component in a 1 pint cup. The mixed material was then poured into a preheated (115–125° F.) aluminum tool (5.5"×5.5"×1.0"). The tool was sealed with an aluminum lid using an air clamp at 80 psi and the foam allowed to expand and cure for 5–7 minutes. The foam plaque was then demolded and allowed to age a minimum of 24 hours prior to dynamic testing. Each of these eight foams was then subjected to dynamic impact testing in comparison to conventional expanded polystyrene (EPS) foam The results of the dynamic testing of each of the eight foams according to the invention and of the EPS comparator are shown in Table 3.

less breakthrough acceleration measured in g's from 2 to about 6 m/s. Also, from FIG. 2, using the flat impactor the invented foam exhibited a greater degree of compression compared to EPS across the entire tested range of impact velocities, from 2 to about 6.5 m/s. This may help explain why the resulting breakthrough acceleration was lower for the invented foam than for the EPS as described above. It is also noteworthy that following the impact tests, the invented foam recovered to substantially 100% of its initial volume and shape with no or negligible noticeable loss of rigidity or strength. Whereas, after each impact, the EPS was irreversibly crushed and was replaced with a fresh EPS test foam in order to conduct an additional impact test at a different impact velocity.

Figure 3:
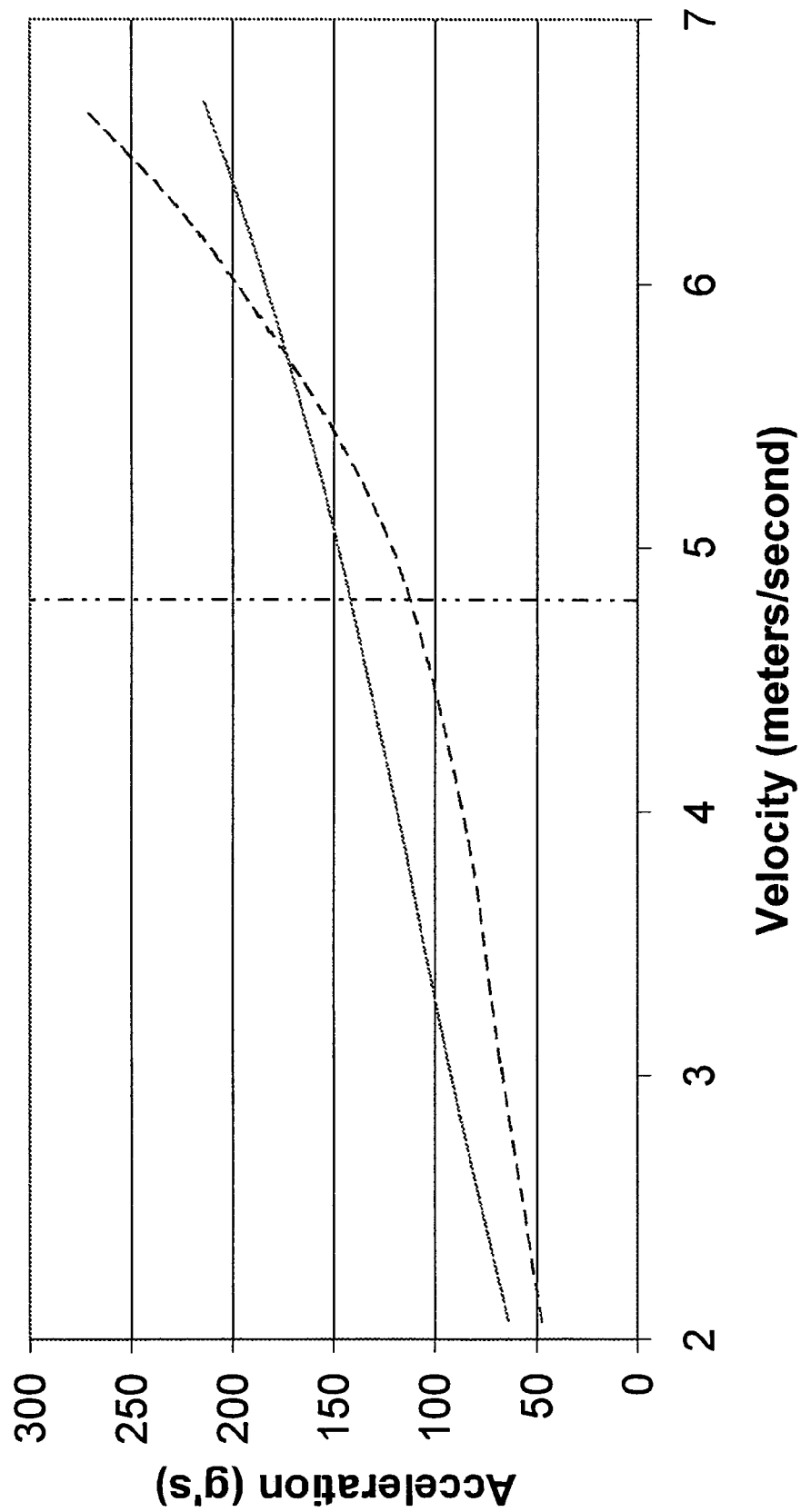
FIG. 3 is a graph similar to that of FIG. 1, except that a spherical impactor was used.
Figure 4:
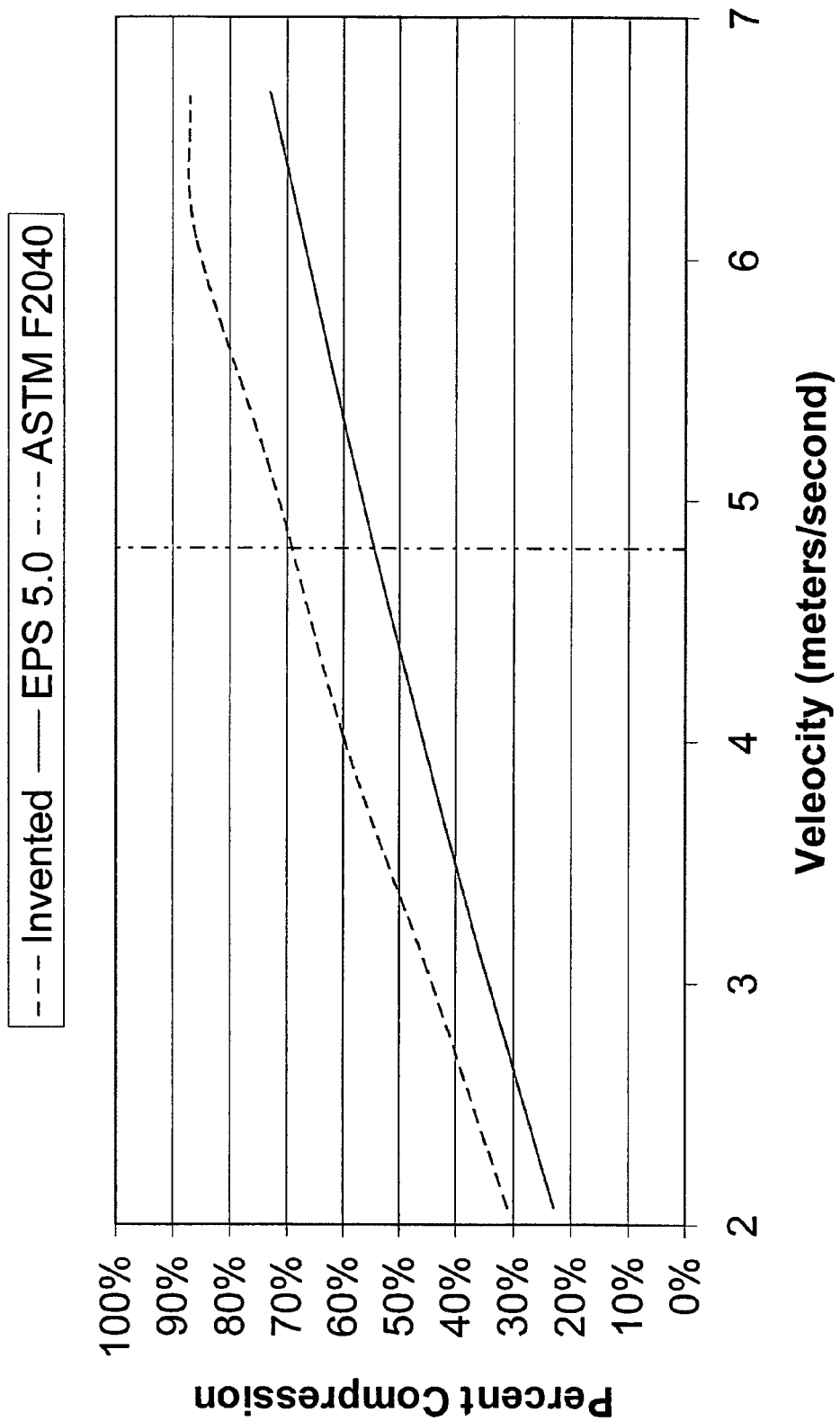
FIG. 4 is a graph similar to that of FIG. 2, except that a spherical impactor was used.
Figure 5:
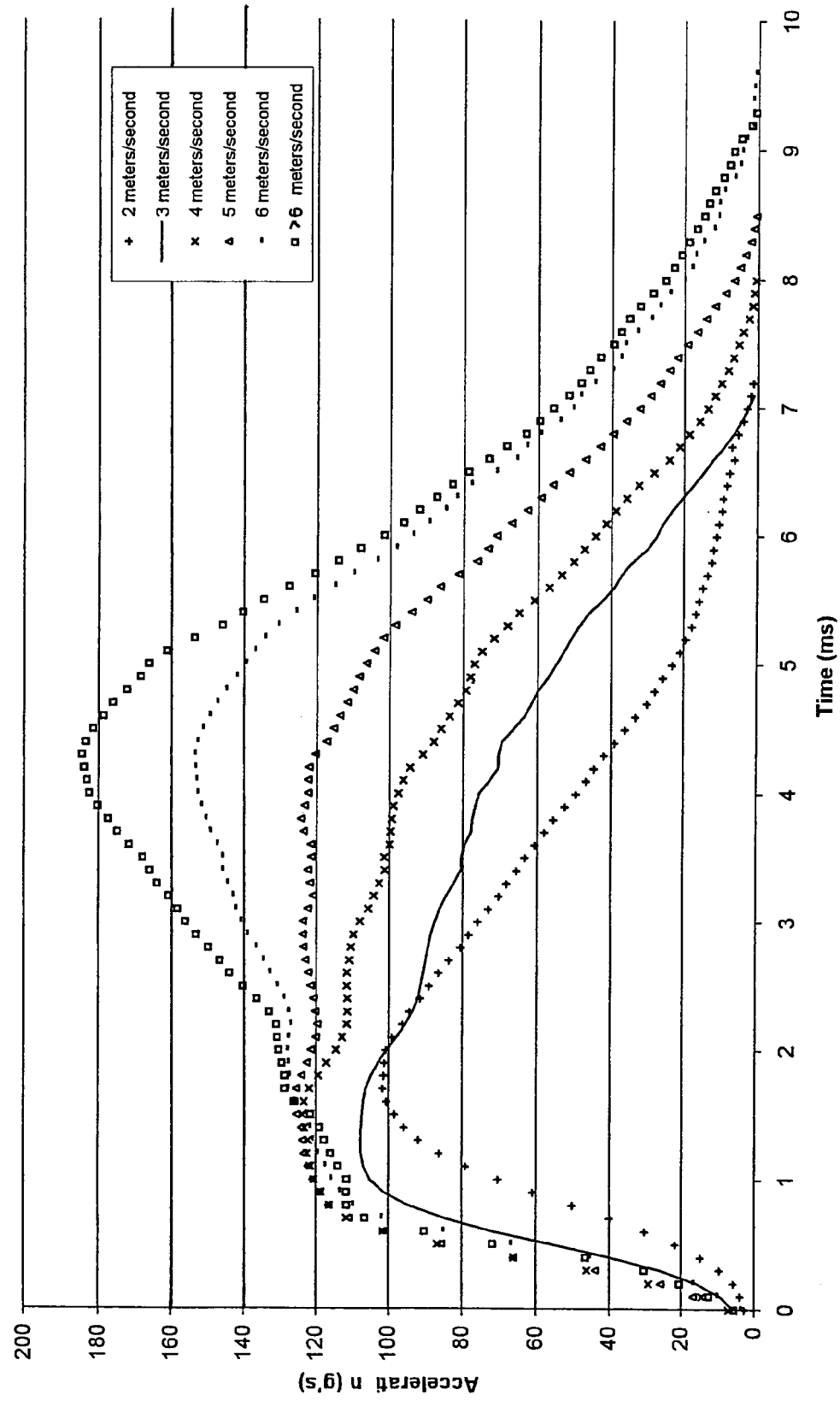
FIG. 5–8 are graphs of additional physical property data measured for the invented viscoelastic foam of Example 1 using a flat impactor for impact velocities ranging from 2 m/s to 7 m/s.
Figure 6:
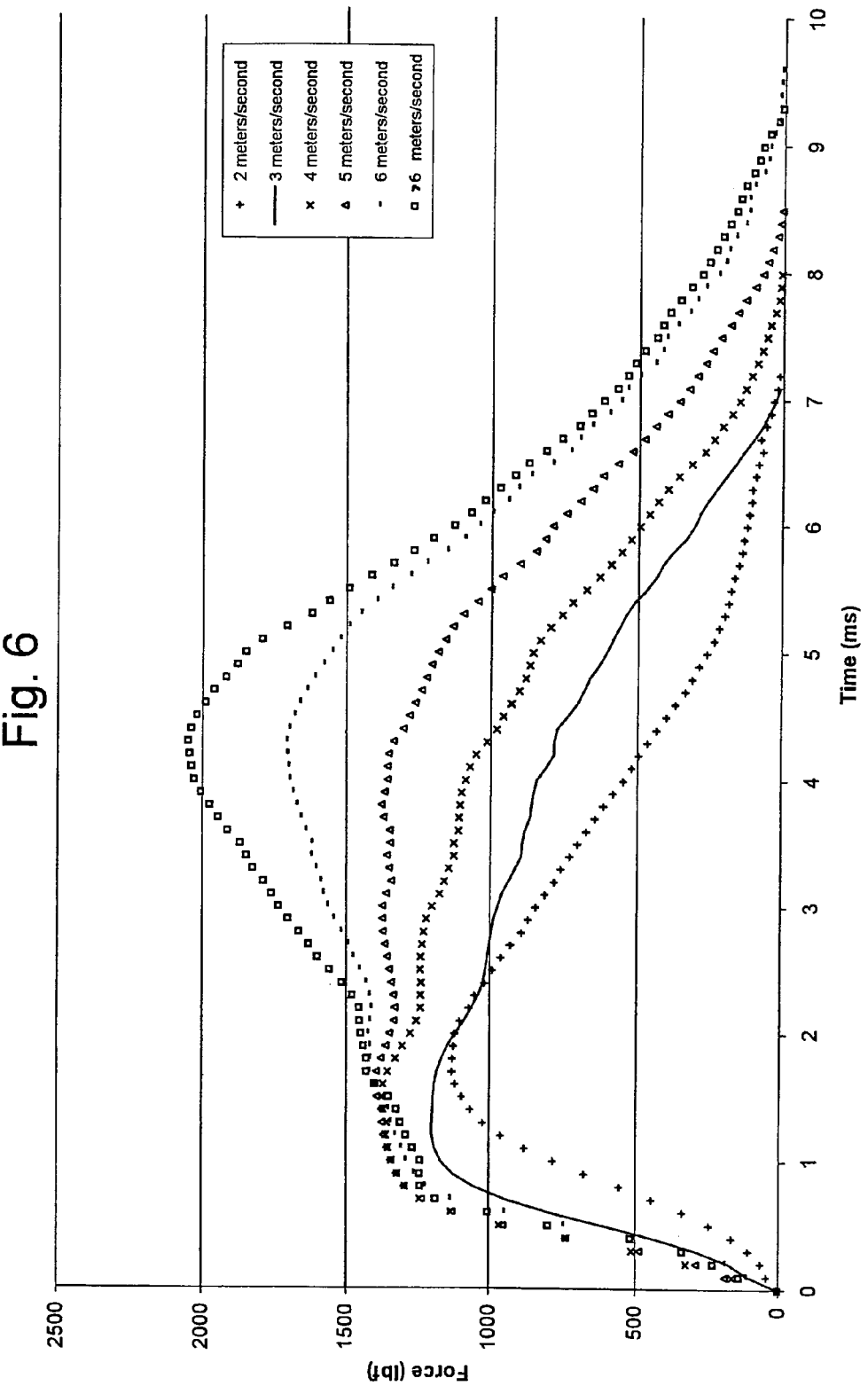
Figure 7:
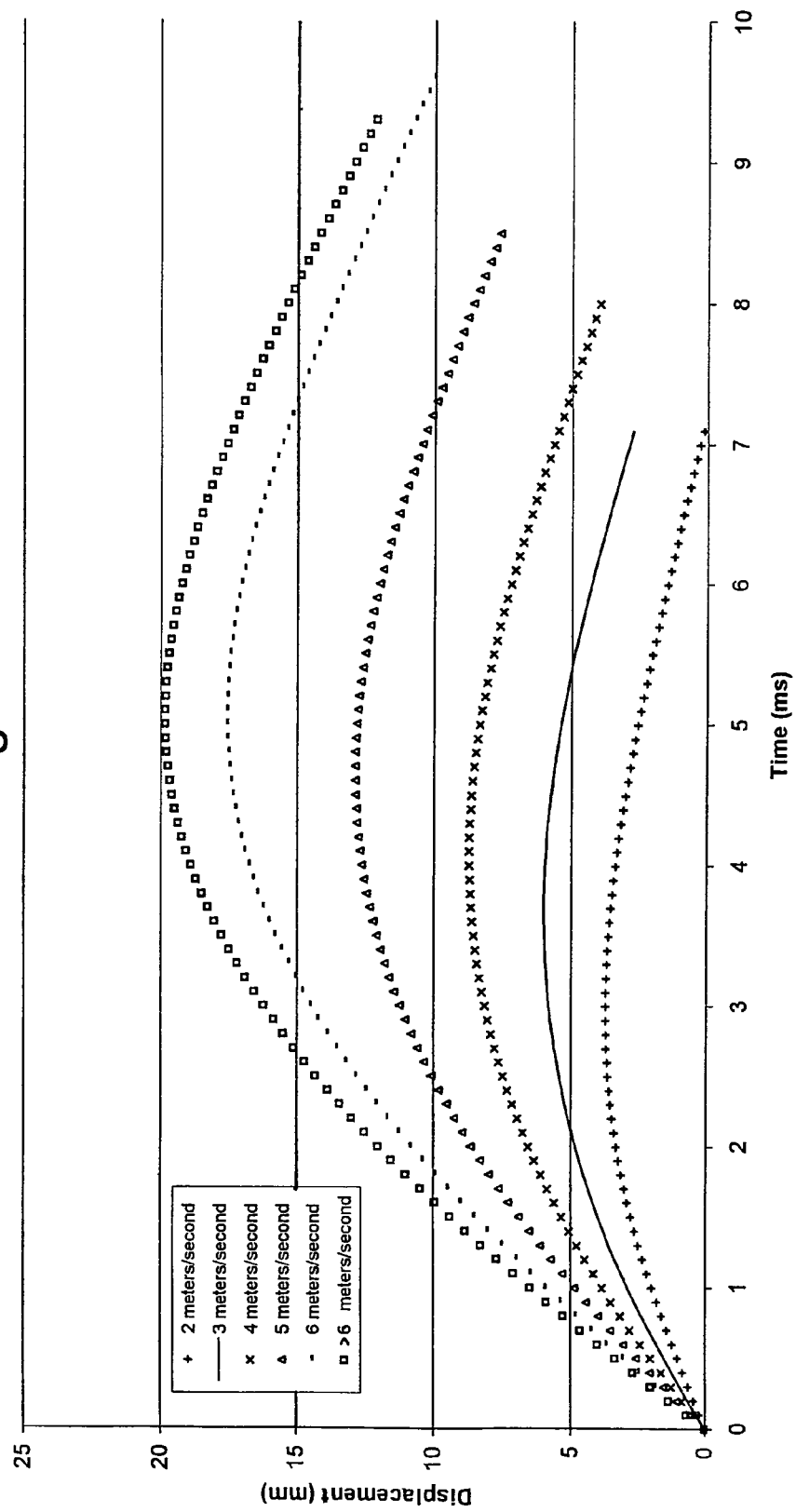
Figure 8:
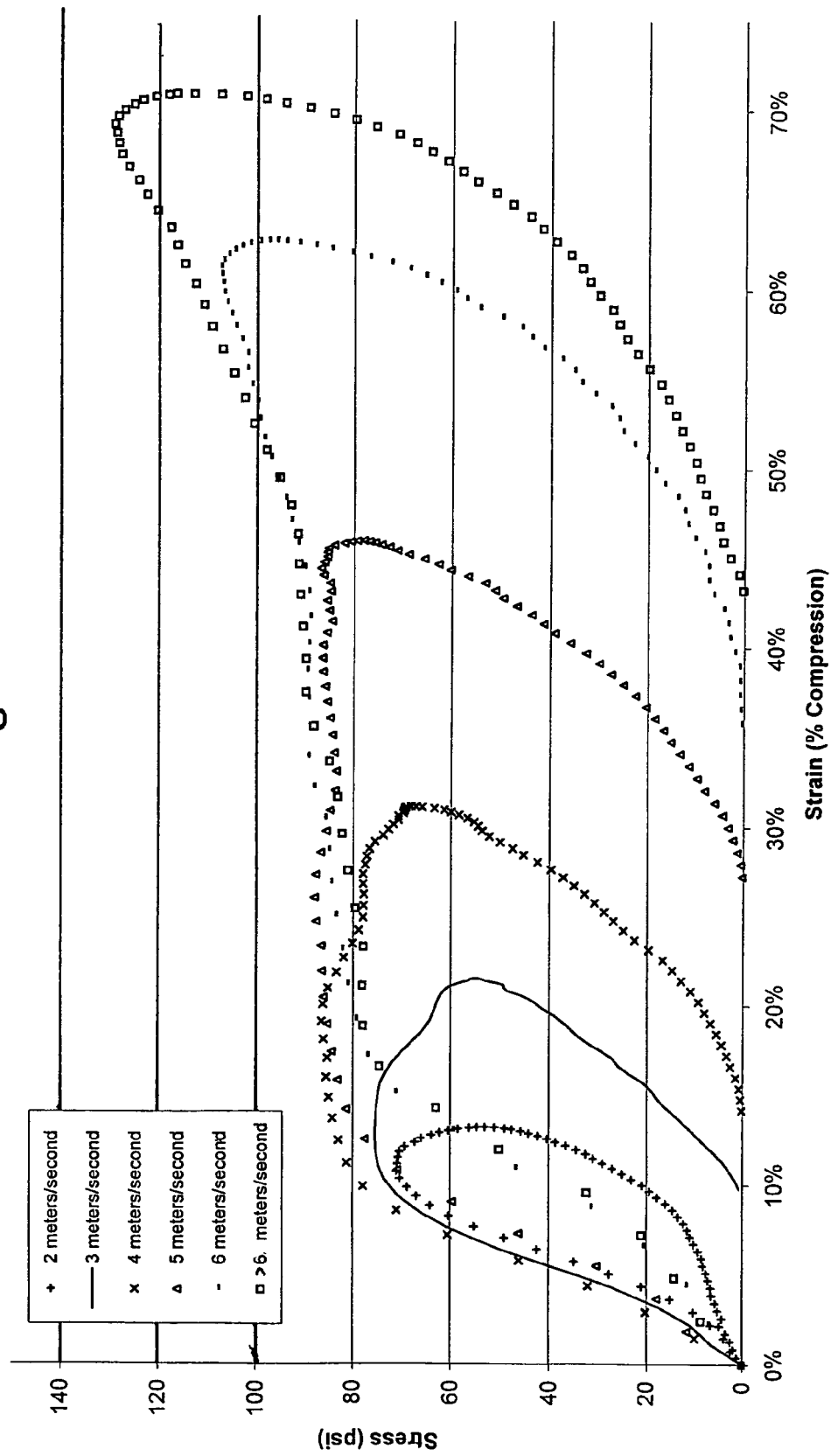
Figure 9:
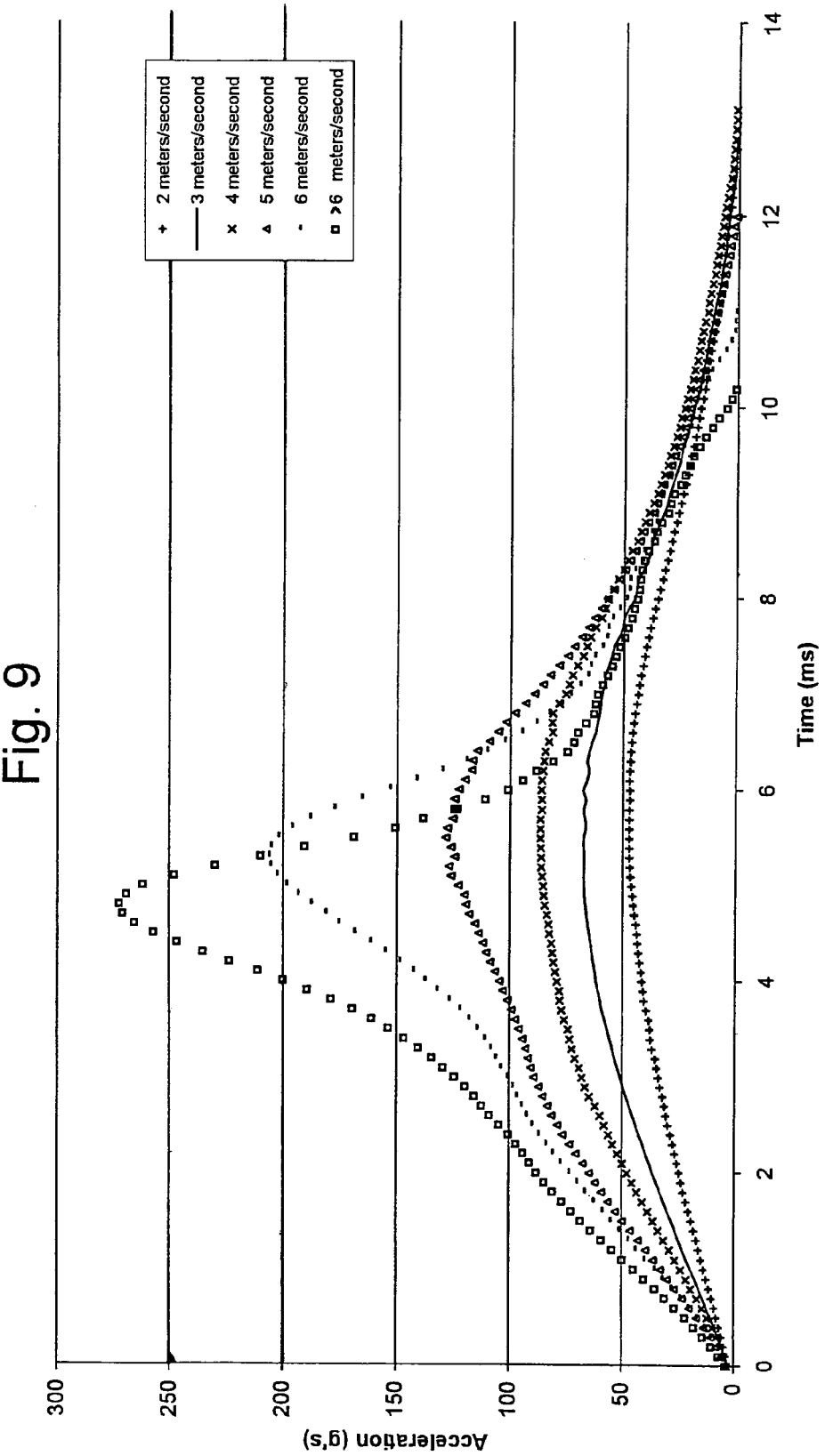
FIGS. 9–12 are graphs of additional physical property data measured for the invented viscoelastic foam of Example 1 using a spherical impactor for impact velocities ranging from 2 m/s to 7 m/s.
Figure 10:
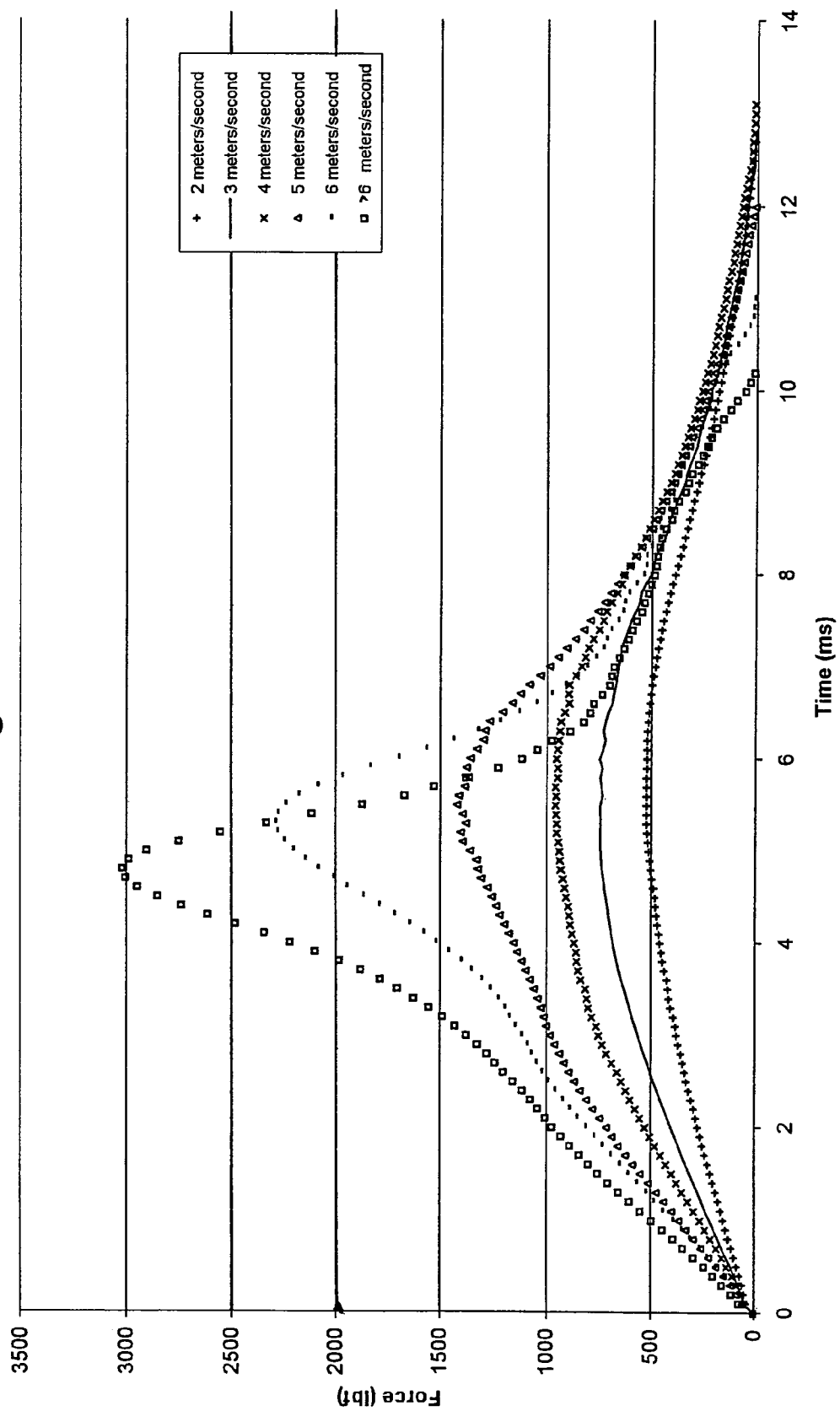
Figure 11:
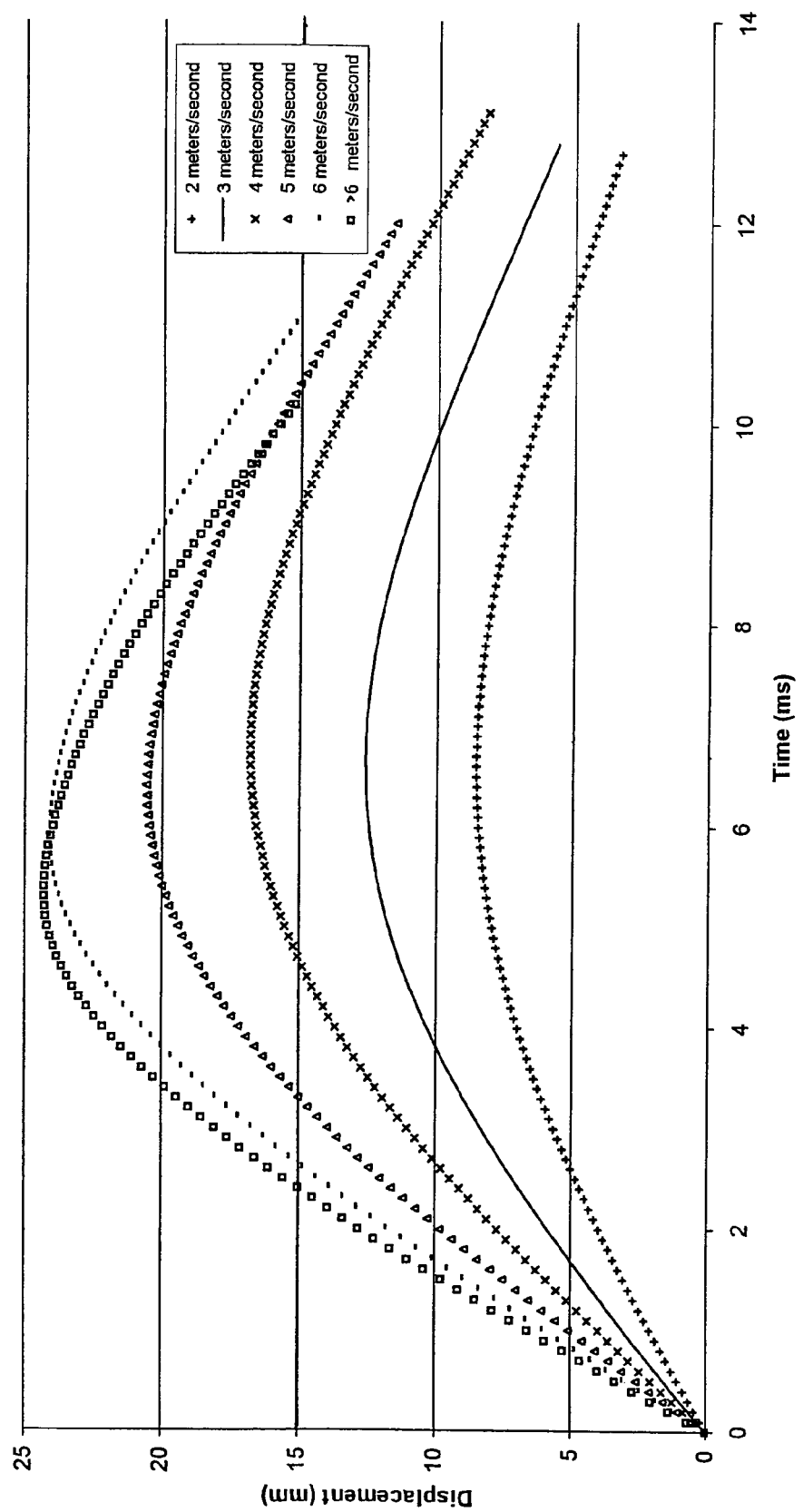
Figure 12:
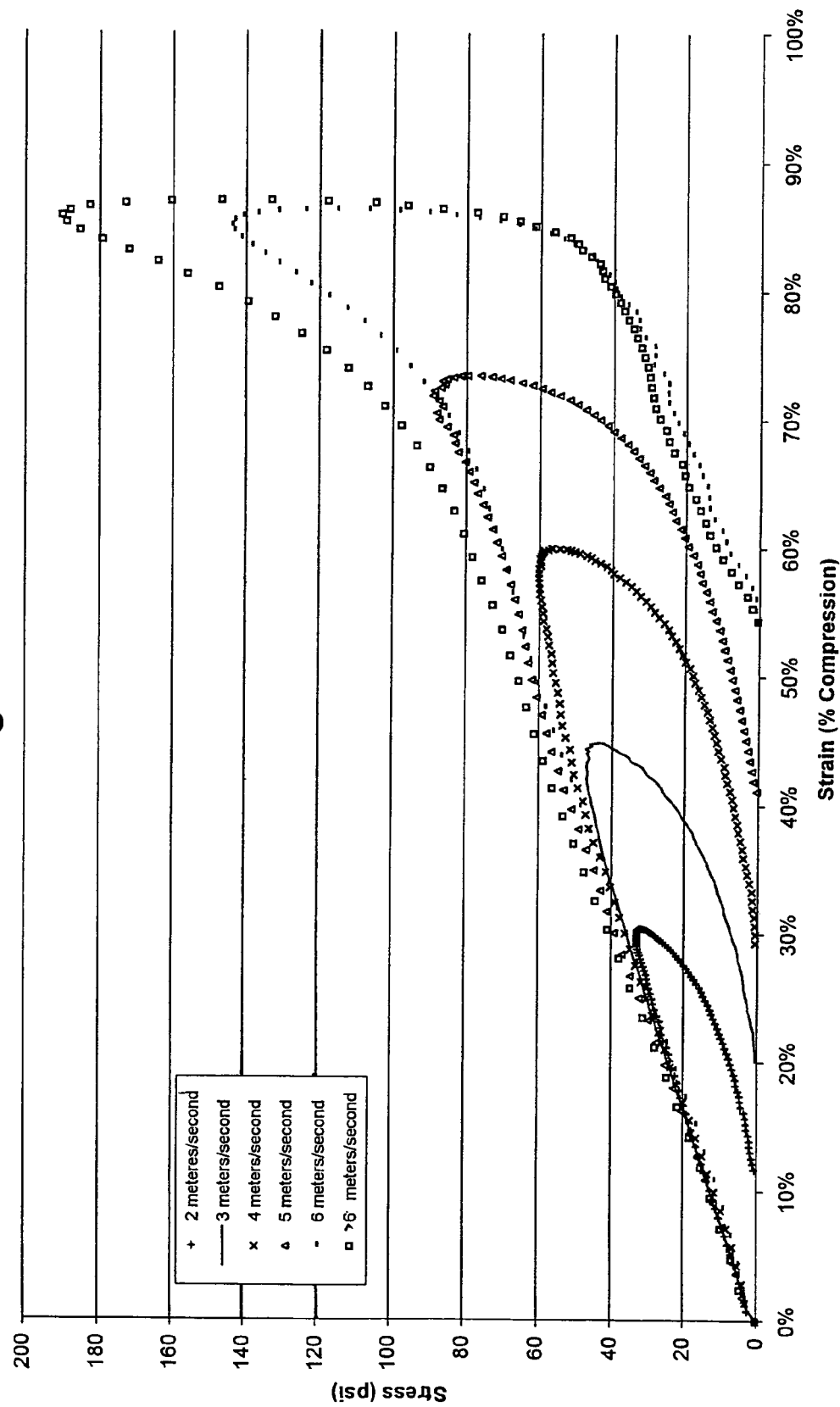
Figure 13:
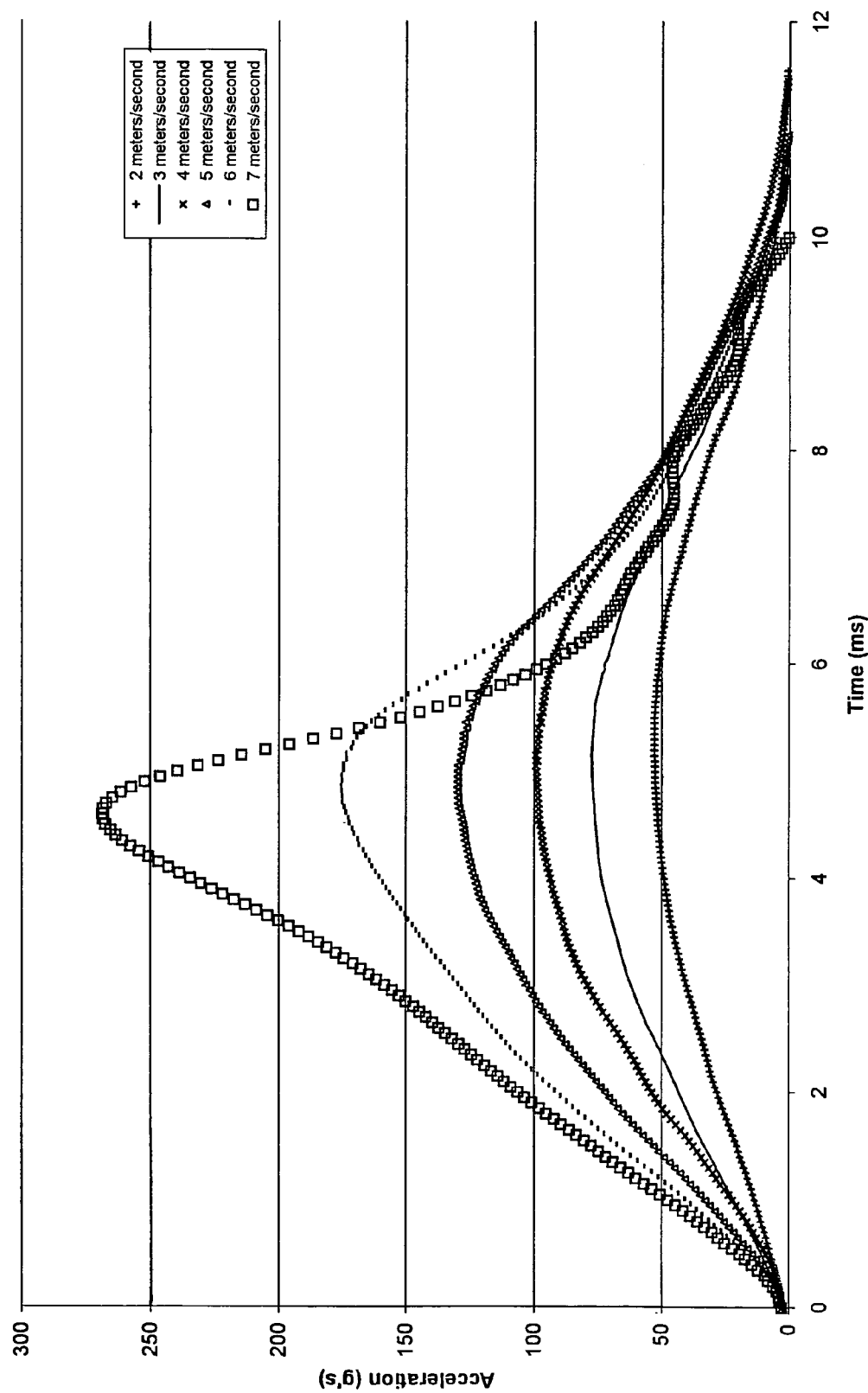
FIGS. 13–16 are graphs of physical property data measured for the invented viscoelastic foam of Example 2 using a spherical impactor for impact velocities ranging from 2 m/s to 7 m/s.
Figure 14:
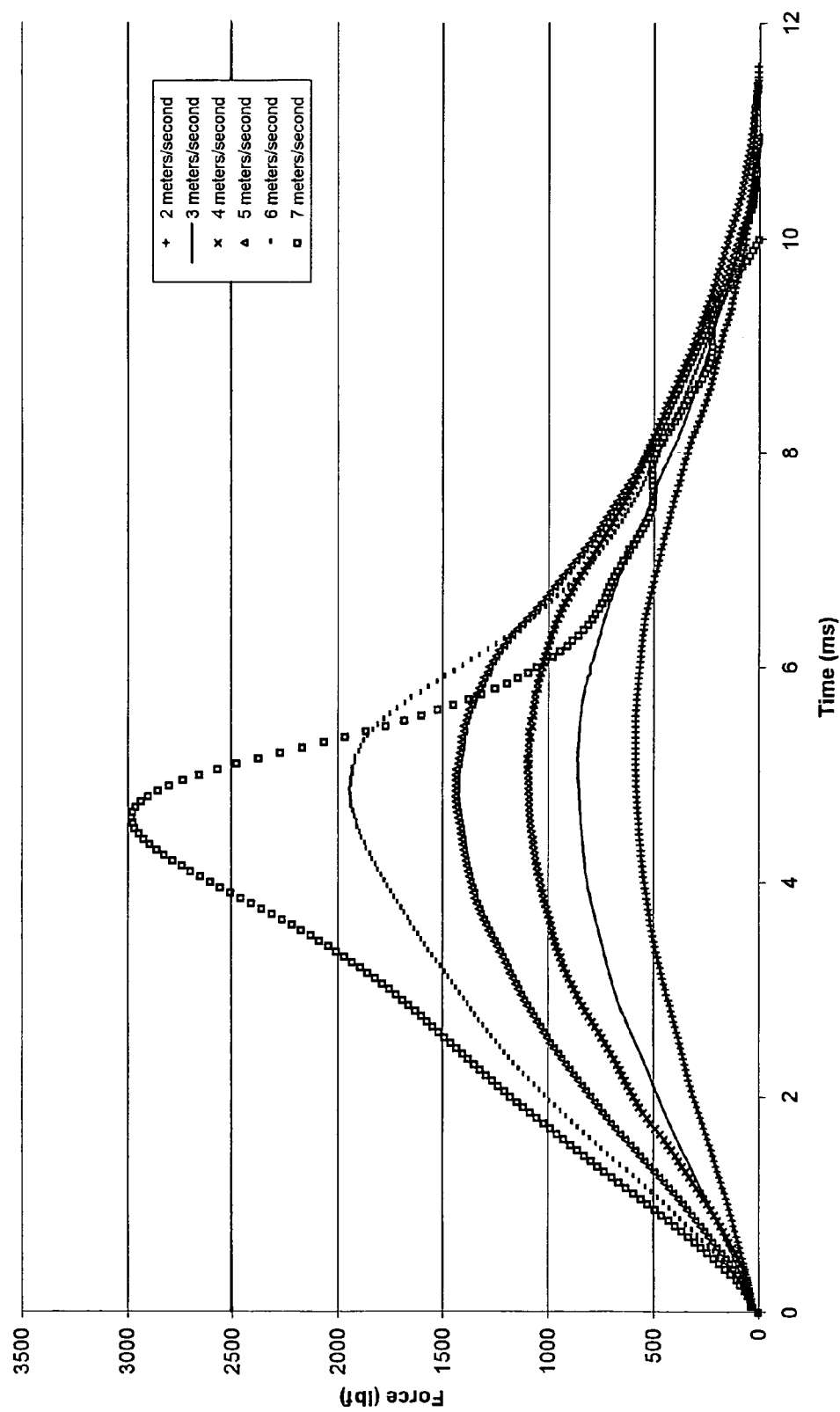
Figure 15:
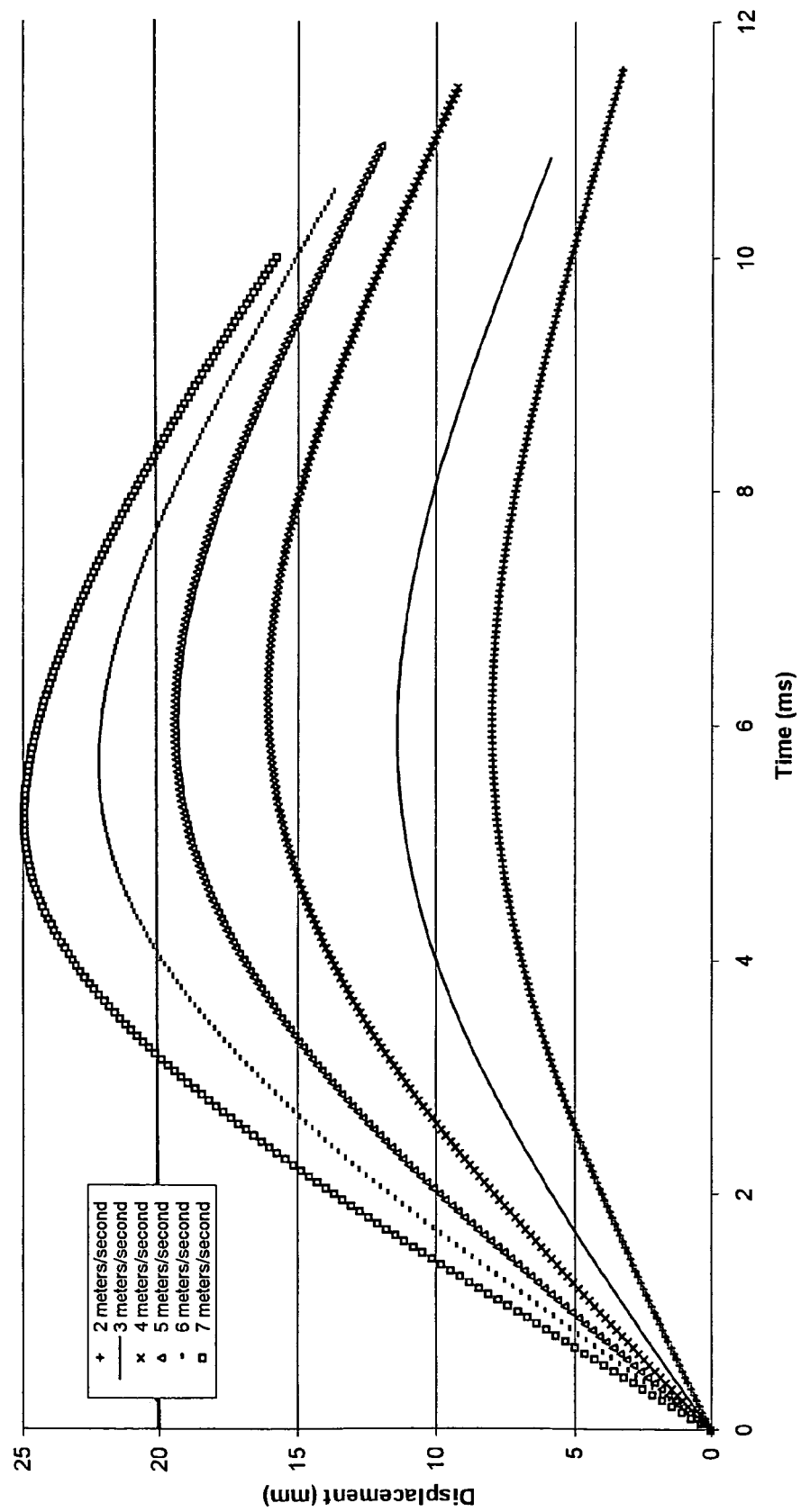
Figure 16:
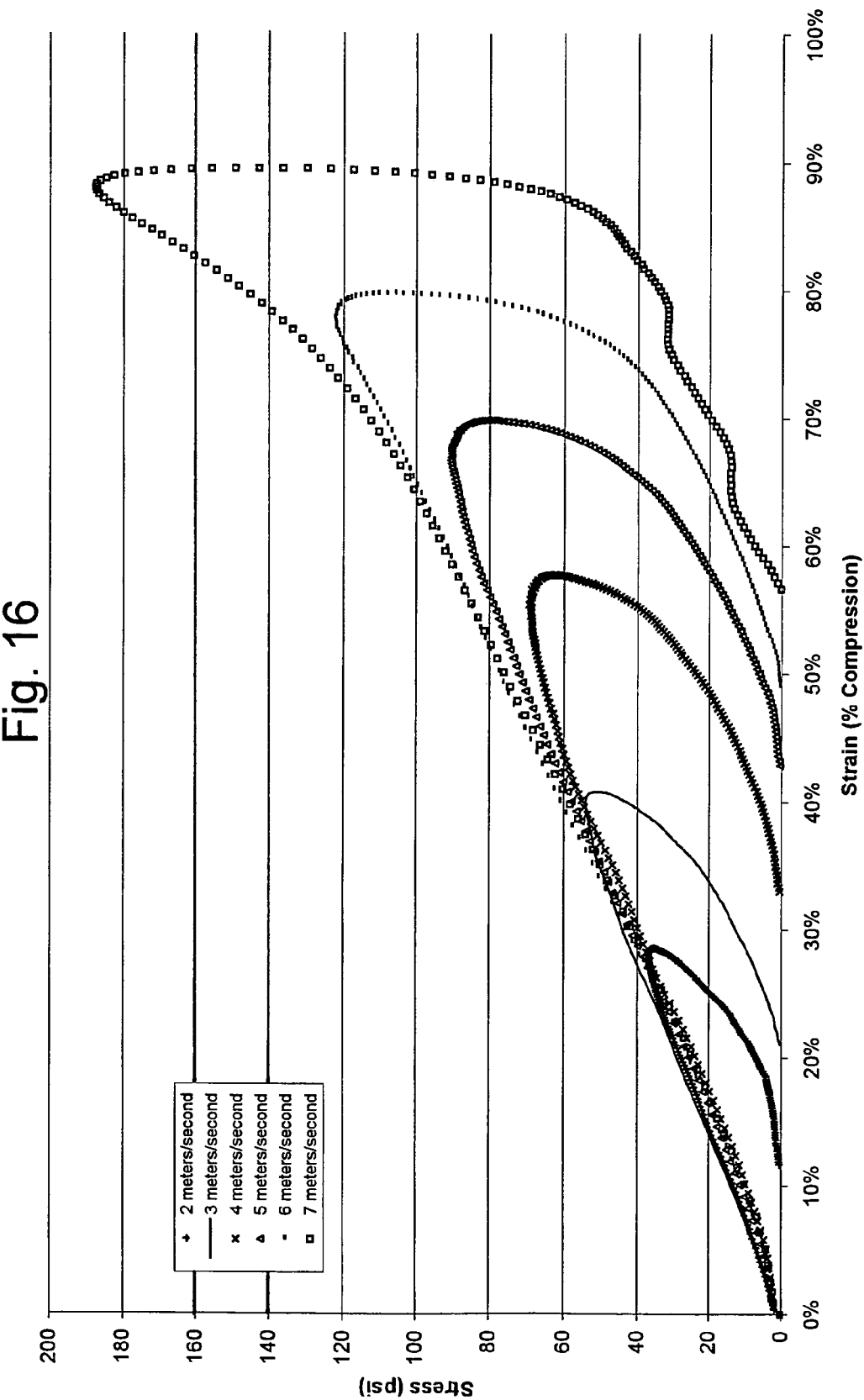

FIG. 3 shows the acceleration versus velocity data for the spherical impactor experiment. From the figure, it can be seen that the invented foam exhibited superior breakthrough acceleration abatement compared to the EPS for low to moderate impact speeds, e.g. from 2 to about 5.8 n/s. Also, FIG. 4 shows the invented foam exhibited superior percent compression across the entire range of tested impact speeds, from 2 to about 6.5 m/s.

FIGS. 5–12 provide additional physical property data for the viscoelastic foam according to the invention. The data in FIGS. 5–8 were measured using a flat impactor as described above, and the data in FIGS. 9–12 were measured using a spherical impactor as described above. As can be seen from the data, the invented foam provides excellent strength and impact absorption characteristics, while retaining its viscoelasticity and substantially recovering 100% following an impact.

The foams according to the invention are highly resilient, highly-rigidity recoverable semi-rigid viscoelastic foams that are capable of absorbing impact energy from high-

TABLE 3

Physical prroperty data for dynamic impact/spherical impactor
Foam Plaques with a .097" (high density polyethylene) HDPE Cover

| | Foam | | | | | | | | |
|---|---|---|---|---|---|---|---|---|---|
| | 1 | 2 | 3 | 4 | 5 | 6 | 7 | 8 | EPS |
| Temperature(° F.) | 78 | 78 | 78 | 78 | 78 | 78 | 78 | 78 | 78 |
| Density (pcf) | 6.51 | 6.55 | 6.94 | 6.65 | 6.71 | 6.61 | 6.62 | 6.69 | 5.0 |
| Impaact Velocity (m/s) | 6.23 | 6.23 | 6.24 | 6.23 | 6.23 | 6.25 | 6.24 | 6.23 | 6.23 |
| Peak g-value | 215 | 205 | 190 | 187 | 199 | 184 | 180 | 188 | 200 |

Example 2

In another experiment, a foam according to the invention was compared to EPS to test break-through acceleration and percent compression versus impact velocity according to ASTM F2040. In this experiment, the Foam No. 2 from Table 2 was used and compared to EPS. The test samples for each of the invented and EPS foams were square samples measuring 5.5"×5.5"×1" thick. The tests were conducted first using a flat circular impactor having a 4-inch diameter, and then using a spherical impactor that also had a 4-inch diameter. The results are provided in FIGS. 1–2 and 3–4 for the flat and spherical impactors respectively. As can be seen from FIG. 1, using the flat impactor the invented foam exhibited significantly less breakthrough acceleration than EPS for impact velocities from 2 to about 6.5 m/s (i.e. resulting from unabsorbed energy which was transmitted through the foam); the invented foam exhibited about 50% energy impacts (4–7 m/s or greater) to a comparable degree relative to conventional EPS foams. Unlike EPS, however, the invented foams are viscoelastic and recover well following an impact meaning that the foams can be reused and need not be discarded after each impact. In addition, because the invented foams are viscoelastic foams and not a rigid foam like EPS, the invented foams can effectively absorb and deflect the impact energy from low to moderate impact speeds. EPS is useless for this purpose because it has virtually no energy absorbing capacity at or below its threshold crush velocity. Below this velocity, EPS acts as a rigid solid and transmits virtually all impact energy to the underlying body part of the user.

It will be understood from the above that the formulation of the invented foam can be tuned to provide a relatively stiffer or more flexible foam depending on the particular application, but generally the invented foam is a stiff semi-rigid viscoelastic foam In an alternative embodiment, surprisingly it has been found that the polyol composition of the present invention may be reacted with the isocyanate of the present invention without the use of added water (or other blowing agent) to produce a higher density foamed (45–60 pcf) elastomer with excellent energy (vibrational) absorption characteristics. This type of material could function as a vibration isolator or dampener for delicate equipment during transportation or while in use.

Although the above-described embodiments constitute the preferred embodiments, it will be understood that various changes or modifications can be made thereto without departing from the spirit and the scope of the present invention as set forth in the appended claims.

What is claimed is:

1. A semi-rigid viscoelastic foam made from a Part A composition and a Part B composition, said Part A composition comprising 20–50 weight percent isocyanate (NCO), said Part B composition comprising 1–15 parts by weight propylene oxide-extended monoethanolamine-based polyether polyol, 6–25 parts by weight propylene oxide-extended triethanolamine-based polyether polyol, 22–40 parts by weight propylene oxide-extended ethylenediamine-based polyether polyol, at least 10 parts by weight of an additional polyol selected from the group consisting of filled polyether polyols and unfilled polyether polyols, and 0.4–4 parts by weight catalyst, said Part B composition having 100 parts by weight total polyols, said Part A and Part B compositions being combined to provide said semi-rigid viscoelastic foam.

2. A semi-rigid viscoelastic foam made from a Part A composition and a Part B composition, said Part A composition comprising 20–50 weight percent isocyanate (NCO), said Part B composition comprising 1–15 parts by weight propylene oxide-extended monoethanolamine-based polyether polyol, 6–25 parts by weight propylene oxide-extended triethanolamine-based polyether polyol, 22–40 parts by weight propylene oxide-extended ethylenediamine-based polyether polyol, at least 10 parts by weight of an additional, tri-functional polyether polyol, and 0.4–4 parts by weight catalyst, said Part B composition having 100 parts by weight total polyols, said Part A and Part B compositions being combined to provide said semi-rigid viscoelastic foam.

3. A semi-rigid viscoelastic foam according to claim 1 or 2, having an index of 80–115.

4. A semi-rigid viscoelastic foam according to claim 1 or 2, having an index of about 90–100.

5. A semi-rigid viscoelastic foam according to claim 1 or 2, said Part B composition further comprising about 3 parts by weight water.

6. A semi-rigid viscoelastic foam according to claim 1 or 2, said Part B composition further comprising about 6 parts by weight black paste.

7. A semi-rigid viscoelastic foam according to claim 1 or 2, said isocyanate in said Part A composition being present in the form of 4,4'-MDI.

8. A semi-rigid viscoelastic foam according to claim 7, said 4,4'-MDI being present in said Part A composition in an amount sufficient to provide an isocyanate (NCO) concentration of about 33.6 percent by weight.

9. A semi-rigid viscoelastic foam according to claim 1 or 2, said isocyanate in said Part A composition being present in the form of an allophanate-modified MDI prepolymer, said part A composition having an isocyanate (NCO) concentration of about 20–30 percent by weight.

10. A semi-rigid viscoelastic foam according to claim 1 or 2, said monoethanolamine based polyol being present in an amount of less than 10 parts by weight, said triethanol amine based polyol being present in an amount of greater than 10 parts by weight, and said ethylenediamine based polyol being present in an amount of 22–36 parts by weight.

11. A semi-rigid viscoelastic foam according to claim 1 or 2, said catalyst comprising amine catalyst in an amount of 0.4–2.5 parts by weight, delayed action catalyst in an amount of 0–1 parts by weight, and trimer catalyst in an amount of 0–1 parts by weight.

12. A semi-rigid viscoelastic foam according to claim 11, said amine catalyst being tertiary amine catalyst, said delayed action catalyst being a combination delayed action catalyst, said trimer catalyst being a quatemary ammonium salt timer catalyst.

13. A semi-rigid viscoelastic foam according to claim 1 or 2, said additional polyol being a glycerin based polyether polyol.

14. A semi-rigid viscoelastic foam according to claim 2, said tri-functional polyether polyol being a non-amine based polyether polyol.

15. A method of making a viscoelastic foam comprising the steps of:
   a) providing a Part A composition comprising 20–50 weight percent isocyanate;
   b) providing a Part B composition comprising 1–15 parts by weight propylene oxide-extended monoethanolamine-based polyether polyol, 6–25 parts by weight propylene oxide-extended triethanolamine-based polyether polyol, 22–40 parts by weight propylene oxide-extended ethylenediamine-based polyether polyol, at least 10 parts by weight of an additional polyol selected from the group consisting of filled polyether polyols and unfilled polyether polyols, and 0.4–4 parts by weight catalyst, said Part B composition having 100 parts by weight total polyols; and
   c) combining said Part A and Part B compositions to provide a semi-rigid viscoelastic foam having an index of 70–130.

16. A method of making a viscoelastic foam comprising the steps of:
   a) providing a Part A composition comprising 20–50 weight percent isocyanate;
   b) providing a Part B composition comprising 1–15 parts by weight propylene oxide-extended monoethanolamine-based polyether polyol, 6–25 parts by weight propylene oxide-extended triethanolamine-based polyether polyol, 22–40 parts by weight propylene oxide-extended ethylenediamine-based polyether polyol, at least 10 parts by weight of an additional, tri-functional polyether polyol, and 0.4–4 parts by weight catalyst, said Part B composition having 100 parts by weight total polyols; and
   c) combining said Part A and Part B compositions to provide a semi-rigid viscoelastic foam having an index of 70–130.

17. A method according to claim 15 or 16, said semi-rigid viscoelastic foam having an index of 90–100.

18. A method according to claim 15 or 16, said Part B composition further comprising about 3 parts by weight water.

19. A method according to claim 15 or 16, said Part B composition further comprising about 6 parts by weight black paste.

20. A method according to claim 15 or 16, said isocyanate in said Part A composition being present in the form of 4,4'-MDI.

21. A method according to claim 20, said 4,4'-MDI being present in said Part A composition an amount sufficient to provide an isocyanate (NCO) concentration of about 33.6 percent by weight in said Part A composition.

22. A method according to claim 15 or 16, said isocyanate in said Part A composition being present in the form of an allophanate-modified MDI prepolymer.

23. A method according to claim 15 or 16, said monoethanolamine based polyol being present in an amount of less than 10 parts by weight, said triethanol amine based polyol being present in an amount of greater than 10 parts by weight, and said ethylenediamine based polyol being present in in an amount of 22–36 parts by weight.

24. A method according to claim 15 or 16, said catalyst comprising amine catalyst in an amount of 0.4–2.5 parts by weight a delayed action catalyst in an amount of 0–1 parts by weight, and a trimer catalyst in an amount of 0–1 parts by weight.

25. A method according to claim 24, said amine catalyst being tertiary amine catalyst, said delayed action catalyst being a combination delayed action amine/delayed action tin catalyst, and said trimer catalyst being a quatemary ammonium salt trimer catalyst.

26. A semi-rigid viscoelastic foam according to claim 1 or 2, said Part B composition further comprising 3–15 parts by weight black paste.

27. A semi-rigid viscoelastic foam according to claim 1 or 2, having an index of 70–130.

28. A semi-rigid viscoelastic foam according to claim 1 or 2, said Part B composition having at least 40 parts by weight total amine-based polyether polyol, wherein the amounts of all polyether polyols in said Part B composition sum to 100 parts by weight.

29. A semi-rigid viscoelastic foam according to claim 1 or 2, said foam being recoverable following a high energy impact.

30. A semi-rigid viscoelastic foam according to claim 29, said foam being substantially 100% recoverable following said high energy impact.

31. A semi-rigid viscoelastic foam according to claim 1 or 2, wherein on impact with a flat circular impactor having a 4-inch diameter according to test method ASTM F2040, a sample of said foam measuring 5.5"×5.5"×1" exhibits breakthrough acceleration in the range of 100 to 150 g's for an impact speed of 2–6 meters/second.

32. A semi-rigid viscoelastic foam, said foam being made from a Part A composition and a Part B composition, said Part A composition comprising 20–50 weight percent isocyanate (NCO), said Part B composition comprising water, at least one catalyst and each of the following, all in parts by weight:

1–15 parts propylene oxide-extended monoethanolamine-based polyether polyol,

6–25 parts propylene oxide-extended triethanolamine-based polyether polyol,

22–40 parts propylene oxide-extended ethylenediamine-based polyether polyol.

0–50 parts filled polyol, and

0–50 parts unfilled polyol;

wherein said Part B composition includes at least one of said filled or unfilled polyols, said Part B composition having 100 parts by weight total polyols.

33. A semi-rigid viscoelastic foam according to claim 32, said filled and unfilled polyols each being glycerin-based and at least tri-functional.

34. A semi-rigid viscoelastic foam according to claim 33, said part B composition comprising 20–30 parts by weight unfilled polyol and 20–30 parts by weight filled polyol.

35. A semi-rigid viscoelastic foam according to claim 34, said foam having an index of 80–115.

36. A semi-rigid viscoelastic foam according to claim 1, 2, or 32, said part B composition comprising 40–60 parts by weight total amine-based polyol.

37. A semi-rigid viscoelastic foam according to claim 36, said part B composition comprising 20–30 parts by weight unfilled polyol and 20–30 parts by weight filled polyol.

38. A semi-rigid viscoelastic foam according to claim 37, said filled and unfilled polyols each being glycerin-based and at least tri-functional.

* * * * *

UNITED STATES PATENT AND TRADEMARK OFFICE
CERTIFICATE OF CORRECTION

PATENT NO. : 7,078,443 B2 Page 1 of 1
APPLICATION NO. : 10/691052
DATED : July 18, 2006
INVENTOR(S) : Charles M. Milliren It is certified that error appears in the above-identified patent and that said Letters Patent is hereby corrected as shown below:

In Column 14, claim 31, line 2, before the word "exhibits", please insert --thick--.

Signed and Sealed this

Seventeenth Day of April, 2007

JON W. DUDAS
*Director of the United States Patent and Trademark Office*